United States Patent
Ouyang et al.

(10) Patent No.: US 11,715,029 B2
(45) Date of Patent: Aug. 1, 2023

(54) UPDATING ATTRIBUTE DATA STRUCTURES TO INDICATE TRENDS IN ATTRIBUTE DATA PROVIDED TO AUTOMATED MODELING SYSTEMS

(71) Applicant: EQUIFAX, INC., Atlanta, GA (US)

(72) Inventors: Jeffrey Q. Ouyang, Atlanta, GA (US); Vickey Chang, Suwanee, GA (US); Rupesh Patel, Atlanta, GA (US); Trevis J. Litherland, Alpharetta, GA (US)

(73) Assignee: EQUIFAX INC., Atlanta, GA (US)

( * ) Notice: Subject to any disclaimer, the term of this patent is extended or adjusted under 35 U.S.C. 154(b) by 1134 days.

(21) Appl. No.: 15/761,864

(22) PCT Filed: Sep. 21, 2016

(86) PCT No.: PCT/US2016/052759
§ 371 (c)(1),
(2) Date: Mar. 21, 2018

(87) PCT Pub. No.: WO2017/053347
PCT Pub. Date: Mar. 30, 2017

(65) Prior Publication Data
US 2018/0285780 A1 Oct. 4, 2018

Related U.S. Application Data

(60) Provisional application No. 62/221,360, filed on Sep. 21, 2015.

(51) Int. Cl.
*G06N 20/00* (2019.01)
*G06F 17/18* (2006.01)
(Continued)

(52) U.S. Cl.
CPC ........... *G06N 20/00* (2019.01); *G06F 16/285* (2019.01); *G06F 17/18* (2013.01); *G06N 7/01* (2023.01); *G06Q 10/063* (2013.01); *G06Q 40/03* (2023.01)

(58) Field of Classification Search
CPC ...... G06N 20/00; G06N 7/005; G06F 16/285; G06F 17/18; G06Q 10/063; G06Q 40/025
See application file for complete search history.

(56) References Cited

U.S. PATENT DOCUMENTS

| | | |
|---|---|---|
| 2003/0093352 A1 | 5/2003 | Muralidhar et al. |
| 2011/0040723 A1 | 2/2011 | O'Donnell et al. |

(Continued)

OTHER PUBLICATIONS

Birvinskas, D. et al, EEG Dataset Reduction and Feature Extraction using Discrete Cosine Transform [online], 2012 [retrieved on May 7, 2021]. Retrieved from Internet:<https://ieeexplore.ieee.org/stamp/stamp.jsp?tp=&arnumber=6410152>, 6 pages (Year: 2012) (Year: 2012).*

(Continued)

*Primary Examiner* — Miranda M Huang
*Assistant Examiner* — Bart I Rylander
(74) *Attorney, Agent, or Firm* — Kilpatrick Townsend & Stockton LLP

(57) ABSTRACT

Certain aspects involve updating data structures to indicate relationships between attribute trends and response variables used for training automated modeling systems. For example, a data structure stores data for training an automated modeling algorithm. The training data includes attribute values for multiple entities over a time period. A computing system generates, for each entity, at least one trend attribute that is a function of a respective time series of attribute values. The computing system modifies the data structure to include the generated trend attributes and updates the training data to include trend attribute values for the trend attributes. The (Continued)

computing system trains the automated modeling algorithm with the trend attribute values from the data structure. In some aspects, trend attributes are generated by applying a frequency transform to a time series of attribute values and selecting, as trend attributes, some of the coefficients generated by the frequency transform.

12 Claims, 6 Drawing Sheets

(51) Int. Cl.
    *G06F 16/28*     (2019.01)
    *G06Q 10/063*     (2023.01)
    *G06N 7/01*     (2023.01)
    *G06Q 40/03*     (2023.01)

(56) References Cited

U.S. PATENT DOCUMENTS

| | | | |
|---|---|---|---|
| 2011/0251870 A1 | 10/2011 | Tavares et al. | |
| 2013/0132390 A1* | 5/2013 | Ghosh .................. | G06F 17/30 707/737 |
| 2015/0170056 A1 | 6/2015 | Breckenridge et al. | |

OTHER PUBLICATIONS

Khandani, A., et al, Consumer credit-risk models via machine-learning algorithms, [retrieved Apr. 13, 2022]. Retrieved from Internet:<https://www.sciencedirect.com/science/article/pii/S0378426610002372> (Year: 2010).*

BCI Competition Datasets, [retrieved Apr. 18, 2022]. Retrieved from Internet:<http://bbci.de/competition/> (Year: 2012).*

Gulutzan, P., MySQL Stored Procedures, [retrieved on Oct. 18, 2022]. Retrieved from Internet:<chrome-extension://efaidnbmnn-nibpcajpcglclefindmkaj/http://dtucker.cs.edinboro.edu/CSCI313/mysql-stored-procedures.pdf> (Year: 2006).*

Tsai, et al, Credit rating by hybrid machine learning techniques, [retrieved Oct. 19, 2022]. Retrieved from Internet:<https://www.sciencedirect.com/science/article/pii/S1568494609001215> (Year: 2009).*

Aghabozorgi, et al., "Time-Series Clustering—A Decade Review", Information Systems, vol. 53, May 6, 2015, pp. 16-38.

Birvinskas, et al., "EEG Dataset Reduction and Feature Extraction Using Discrete Cosine Transform", Computer Modeling and Simulation (EMS). Sixth Uksim/Amss European Symposium on, IEEE, Nov. 14, 2012, pp. 199-204.

EP16849456.5, "Extended European Search Report", dated May 28, 2019, 9 pages.

Liao, "Clustering of Time Series Data—A Survey", Pattern Recognition, vol. 38, No. 11, Nov. 1, 2005, pp. 1857-1874.

Shayegan, et al., "A New Dataset Size Reduction Approach for PCA-Based Classification in OCR Application", Mathematical Problems in Engineering, vol. 2014, Apr. 17, 2014, pp. 1-14.

Wang, et al., "Training Data Selection for Support Vector Machines", Advances in Natural Computation; [Lecture Notes in Computer Science;Lncs], Springer-Verlag, Berlin/ Heidelberg, Jul. 23, 2005, pp. 554-564.

AU2016328959, "First Examination Report", dated Feb. 9, 2021, 5 pages.

Indian Patent Application No. 201817010214, "First Examination Report", dated Feb. 26, 2021, 7 pages.

International Patent Application No. PCT/US2016/052759, "International Search Report and Written Opinion", dated Dec. 30, 2016, 12 pages.

Australian Patent Application No. 2016328959, "Notice of Acceptance", dated Jun. 16, 2021, 3 pages.

European Patent Application No. 16849456.5, "Office Action", dated Oct. 8, 2021, 8 pages.

* cited by examiner

UPDATING ATTRIBUTE DATA STRUCTURES TO INDICATE TRENDS IN ATTRIBUTE DATA PROVIDED TO AUTOMATED MODELING SYSTEMS

CROSS-REFERENCE TO RELATED APPLICATIONS

This is a U.S. national phase under 35 U.S.C. 371 of International Patent Application No. PCT/US2016/052759, entitled "Updating Attribute Data Structures to Indicate Trends in Attribute Data Provided to Automated Modeling Systems", filed Sep. 21, 2016, which disclosure claims priority to U.S. Provisional Application No. 62/221,360, entitled "Analytical System Utilizing Detailed time-Series Data," filed Sep. 21, 2015, the entirety of which is hereby incorporated by reference herein.

TECHNICAL FIELD

This disclosure generally relates to digital data processing systems and methods for emulation of decision-making and other intelligence, and more particularly relates to updating attribute data structures to indicate trends in attribute data used for training and otherwise operating automated modeling systems.

BACKGROUND

Automated modeling systems implement automated modeling algorithms (e.g., algorithms using modeling techniques such as logistic regression, neural networks, support vector machines, etc.) that are trained using large volumes of training data. This training data, which can be generated by or otherwise indicate certain electronic transactions or circumstances, is analyzed by one or more computing devices of an automated modeling system. The training data is grouped into attributes that are provided as inputs to the automated modeling system. The automated modeling system can use this analysis to learn from and make predictions regarding similar electronic transactions or circumstances. For example, the automated modeling system uses the attributes to learn how to generate a value of a response variable, such as a predictive output, involving transactions or other circumstances similar to attributes from the training data.

SUMMARY

Certain aspects and examples are disclosed for updating attribute data structures, where a modified attribute data structure indicates attribute trends in training data or other input data for automated modeling systems. For example, a data structure stores data for training an automated modeling algorithm. The training data includes attribute values for multiple entities over a time period. A computing system generates, for each entity, at least one trend attribute that is a function of a respective time series of attribute values. Each trend attribute indicates a trend in the attribute-value time series. The computing system modifies the data structure to include the generated trend attributes and updates the training data to include trend attribute values for the trend attributes. The computing system trains the automated modeling algorithm with the trend attribute values from the data structure. In some aspects, trend attributes are generated by applying a frequency transform to a time series of attribute values and selecting, as trend attributes, some of the coefficients generated by the frequency transform.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
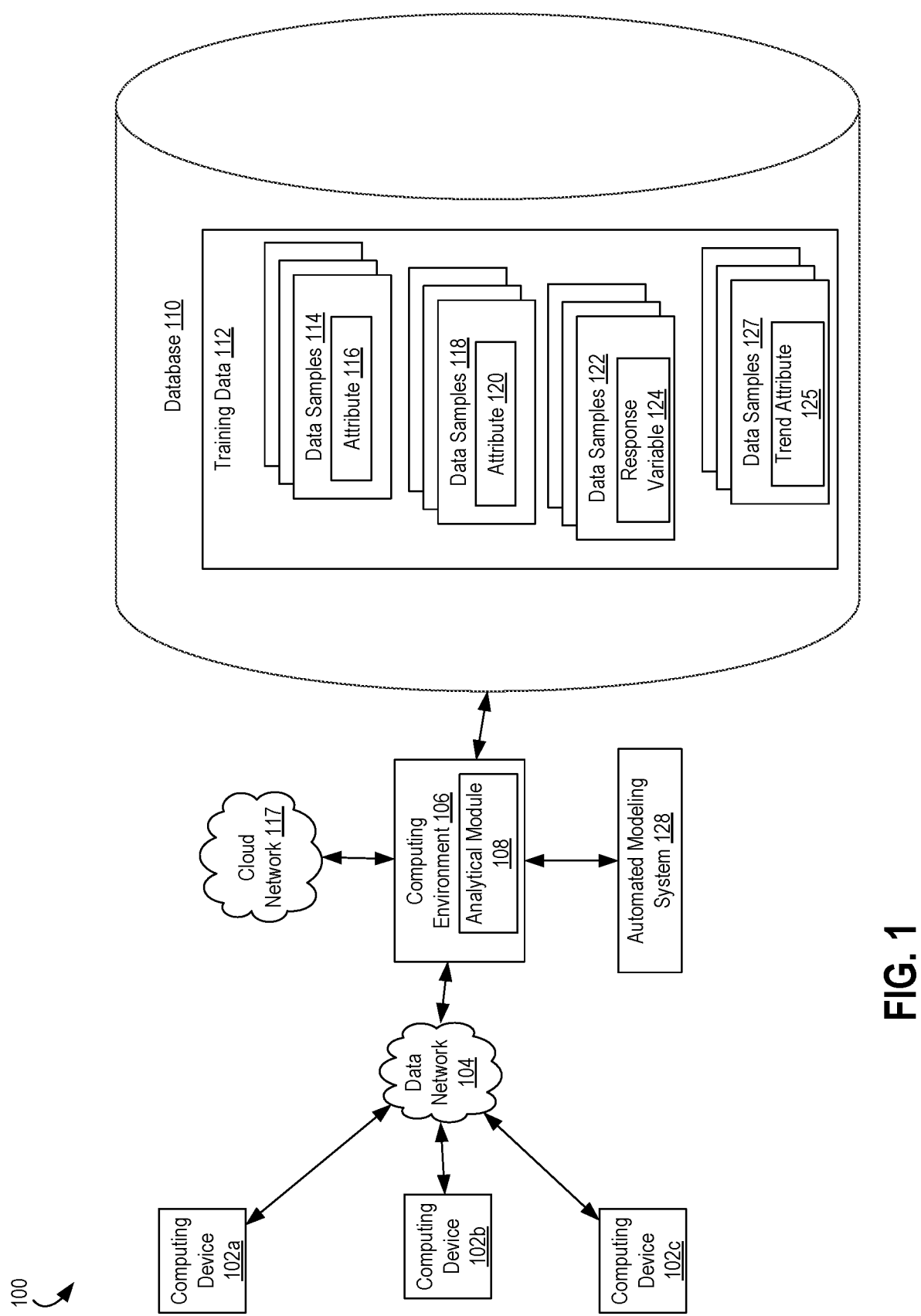
FIG. 1 depicts an example of a computing system that can generate trend attributes for an automated modeling algorithm, according to some aspects of the present disclosure.

Certain aspects of this disclosure describe modifying attribute data structures, where a modified attribute data structure indicates trends in attribute data that is used for training automated modeling systems or otherwise operating automated modeling systems. For instance, certain attributes that describe prior behavior of entities can be used to generate risk assessments or other response variable outputs. An attribute data structure can include a database or other data structure that is used to store data samples with values of different attributes. In some aspects, an attribute data structure also stores values of one or more response variables that are associated with attributes.

Certain aspects can improve systems that utilize attribute data structures by creating a trend attribute for use in an automated modeling algorithm. A trend attribute can indicate one or more time-based characteristics of time series of attribute values. For example, if an attribute measures or otherwise indicates certain electronic transactions involving an entity that occur over a time period of 48 months, a trend attribute for the entity can indicate cyclic activity by the entity or other patterns of behavior by the entity during the time period. One or more trend attributes can be provided as inputs to an automated modeling algorithm (e.g., as training data for the automated modeling algorithm).

In some aspects, trend attribute values can be computed as a function of the attribute values in a time series. For instance, the function can use changes in the attribute values of the time series over a time period to compute a trend attribute value. Examples of functions that use changes in attribute values over time include certain statistical functions, frequency transforms, functions for computing duration attributes, functions for computing depression/recovery attributes, etc.

In some aspects, a function for computing a trend attribute value can be a discrete cosine transform ("DCT") that is applied to a time series of attribute values. The DCT can output a corresponding set of coefficients for the frequency domain. The values of the coefficients can indicate the presence or absence of certain cyclical characteristics of the time series. One or more of the coefficients can be selected as a trend attribute. In some aspects, trend attribute data that is generated using a DCT or other frequency transform can be provided to an automated algorithm in the place of an attribute that was used in computing the trend attribute value (e.g., original data from a time series of attribute values).

Certain aspects disclosed herein can provide improvements over existing computing systems that train or otherwise use automated modeling algorithms. For example, existing automated modeling systems, which perform risk assessments or other analytical operations involving an automated modeling algorithm, may utilize a snapshot of attribute data at a given point in time as an input to the automated modeling algorithm. Such attribute values may correspond to only one point in time (e.g., all attribute values generated during a specific day, week, or month). These existing automated modeling systems may be unable to utilize time series data about attributes. Thus, if these existing automated modeling systems are used to predict the behavior of certain entities, the prediction rely on the entities' currently known characteristics and circumstances at a specified point in time. Relying on this static snapshot of attribute data can result in a predictive output that is inaccurate or otherwise sub-optimal.

But using trend attributes as described herein allows automated modeling systems to use, as inputs to the automated modeling algorithm, data that describes characteristics and circumstances of an entity that change over time. For example, DCT coefficients or other trend attributes may have values that accurately represent cyclic characteristics and circumstances of an entity. An automated modeling system can learn associations between these trend attributes and certain outcomes, and thereby produce more accurate results, even if the automated modeling system does not use an entire time series of attributes values as inputs to an automated modeling algorithm.

Moreover, the accuracy with which an automated modeling algorithm learns to make predictions of future actions can depend on the data attributes used to train the automated modeling algorithm or otherwise provided as inputs to the automated modeling algorithm. For instance, larger amounts of input data (e.g., more data samples, more attributes, etc.) allow the automated modeling algorithm to identify different scenarios that may affect a predictive output, to increase the confidence that a trend associated with the training data has been properly identified, or both. Thus, if an automated modeling algorithm uses, as inputs, a larger number of attributes, such as trend attributes, that have some predictive relationship with a predictive output, the accuracy of the predictive output increases.

Furthermore, in some existing systems, multiple datasets of attribute values may be used as inputs in subsequent executions of existing automated modeling algorithms to improve the accuracy of the automated modeling algorithm. Each dataset corresponds to a different point in time. But using multiple datasets from multiple points in time consumes additional computing resources (e.g., memory space, processing allocation).

Thus, additionally or alternatively, certain aspects disclosed herein can improve the efficiency with which automated modeling systems utilize computing resources (e.g., processing capacity, memory capacity, network bandwidth, etc.). In a simplified example, a trend attribute can be a single data point (e.g., a DCT coefficient, a curve slope, etc.) that represents information for multiple data points in a time series. Thus, an automated modeling algorithm can be trained or otherwise executed using the single data point (i.e., the trend attribute value) rather than performing multiple training iterations or other executions using multiple data points (e.g., multiple values of a time series).

Thus, a trend attribute can concisely encode trend-based information about a time series and thereby reduce or eliminate the need for an automated modeling algorithm to derive the trend-based information from a large dataset (i.e., a time series). Therefore, in some aspects, using trend attributes can reduce or eliminate the need to provide multiple datasets of attribute values to an automated modeling system in order to capture cyclic or other trend-based information from a time series. Reducing or eliminating the need to provide multiple datasets of attribute values to an automated modeling system can allow for more efficient use of processing resources, reduce memory requirements at the automated modeling system (e.g., for storing a time series), reduce network usage (e.g., bandwidth used to transmit a time series), or some combination thereof.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 depicts an example of a computing system 100 that can create trend attributes usable for training automated modeling algorithms or other machine-learning algorithms. FIG. 1 depicts examples of hardware components of a computing system 100 according to some aspects. The computing system 100 is a specialized computing system that may be used for processing large amounts of data using a large number of computer processing cycles.

The computing system 100 may include a computing environment 106. The computing environment 106 may be a specialized computer or other machine that processes the data received within the computing system 100. The computing environment 106 may include one or more other systems. For example, the computing environment 106 may include a database system for accessing network-attached data stores, a communications grid, or both. A communications grid may be a grid-based computing system for processing large amounts of data.

The computing system 100 may also include one or more network-attached data stores for storing a database 110 or other suitable attribute data structure. An attribute data structure can be any data structure suitable for storing data samples that have values for one or more attributes, one or more predictive output values associated with the attributes, or both. In some aspects, training data 112 (or other input data) stored in the database 110 includes a set of attribute values for multiple entities over a time period. Each data item in the training data or other input data indicates one or more attribute values, a time value within the time period, and an entity associated with the attribute value, the time value, or both. Network-attached data stores can include memory devices for storing training data 112 to be processed by the computing environment 106. (In some aspects, the network-attached data stores can also store any intermediate or final data generated by one or more components of the computing system 100.) Although a database 110 is described herein as an example of a data structure for storing the training data 112, the analytical module 108 may be used to modify any data structure suitable for storing training data that is grouped into attributes.

The training data 112 can be provided by one or more computing devices 102a-c, generated by computing devices 102a-c, or otherwise received by the computing system 100 via a data network 104. In some aspects, the training data 112 can be time-series data that is retrieved from proprietary data repositories. The time-series data can include, for example, data organized on a month-by-month basis or other suitable interval of time. For illustrative purposes, the various attributes are described herein in terms of months. However, any suitable interval of time can be used.

An automated modeling algorithm can use the training data 112 to learn relationships between attributes and one or more predictive output variables or other response variables. The training data 112 can include data samples 114 having values for an attribute 116 and data samples 118 having values for an attribute 120. For example, data samples 114, 118 may include attribute values for different entities that engage in electronic transactions over a certain time period. The data samples 114 can include, for each entity, a respective time series of data for the attribute 116. The data samples 118 can include, for each entity, a respective time series of data for the attribute 120. The training data 112 can also include data samples 122 having values for a response variable 124 (e.g., a predictive output variable such as a consumer credit risk computed from credit-related attributes, a risk assessment involved with certain assets, a user response to certain online content transmitted to the user, etc.). Any suitable attributes 116, 120 can be analyzed using the analytical module 108. Examples of attributes that may be analyzed include (but are not limited to) credit scores, account balances, income, purchases including the dollar amount and terms, aggregated household wealth-to-income data, employment history data, etc.

In one example, the training data 112 is generated by electronic transactions involving individuals or other entities. A large number of observations can be generated by electronic transactions. A given observation can include one or more attributes (or data from which an attribute can be computed or otherwise derived). The observation can also include data for one or more response variables (e.g., predictive output variables) or data from which a response variable value can be computed or otherwise derived.

Network-attached data stores used in the computing system 100 may also store a variety of different types of data organized in a variety of different ways and from a variety of different sources. For example, network-attached data stores may include storage other than primary storage located within computing environment 106 that is directly accessible by processors located therein. Network-attached data stores may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The computing environment 106 can include one or more processing devices that execute program code. The program code, which is stored on a non-transitory computer-readable medium, can include the analytical module 108. The analytical module 108 can generate one or more trend attributes 125. Examples of generating trend attributes 125 are described herein with respect to FIGS. 2-9.

The computing system 100 may also include one or more automated modeling systems 128. The computing environment 106 may route select communications or data to the automated modeling systems 128 or one or more servers within the automated modeling systems 128. Examples of an automated modeling system 128 include a mainframe computer, a grid computing system, or other computing system that executes an automated modeling algorithm (e.g., an algorithm using logistic regression, neural networks, etc.) that can learn or otherwise identify relationships between attributes and response variables (e.g., predictive output variables).

Automated modeling systems 128 can be configured to provide information in a predetermined manner. For example, automated modeling systems 128 may access data to transmit in response to a communication. Different automated modeling systems 128 may be separately housed from each other device within the computing system 100, such as computing environment 106, or may be part of a device or system. Automated modeling systems 128 may host a variety of different types of data processing as part of the computing system 100. Automated modeling systems 128 may receive a variety of different data from the computing devices 102a-c, from the computing environment 106, from cloud network 117, or from other sources.

The computing system 100 can also include one or more computing devices 102a-c. The computing devices 102a-c may include client devices that can communicate with the computing environment 106. For example, the computing devices 102a-c may send data to the computing environment 106 to be processed, may send signals to the computing environment 106 to control different aspects of the computing environment or the data it is processing. The computing devices 102a-c may interact with the computing environment 106 via one or more data networks 104.

The computing devices 102a-c may include network computers, sensors, databases, or other devices that may transmit or otherwise provide data to computing environment 106. For example, the computing devices 102*a-c* may include local area network devices, such as routers, hubs, switches, or other computer networking devices.

The computing system 100 may also include one or more cloud networks 117. A cloud network 117 may include a cloud infrastructure system that provides cloud services. In certain examples, services provided by the cloud network 117 may include a host of services that are made available to users of the cloud infrastructure system on demand. A cloud network 117 is shown in FIG. 1 as being connected to computing environment 106 (and therefore having computing environment 106 as its client or user), but cloud network 117 may be connected to or utilized by any of the devices in FIG. 1. Services provided by the cloud network 117 can dynamically scale to meet the needs of its users. The cloud network 117 may include one or more computers, servers, or systems. In some aspects, one or more end-user devices can access the computing environment 106, network-attached data stores included in the computing system 100, the automated modeling system 128, or some combination thereof via the cloud network 117.

The numbers of devices depicted in FIG. 1 are provided for illustrative purposes. Different numbers of devices may be used. For example, while each device, server, and system in FIG. 1 is shown as a single device, multiple devices may instead be used.

Each communication within the computing system 100 (e.g., between client devices, between automated modeling systems 128 and computing environment 106, or between a server and a device) may occur over one or more data networks 104. Data networks 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 104. The data networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

In some aspects, an automated modeling system 128 can perform one or more risk assessments or other analytical operations. Examples of risk assessments and other analytical operations performed by the automated modeling system 128 include identifying customers whose credit may be changing or remaining stable over time, assessing risks involved with a set of financial assets, etc. For instance, the automated modeling system 128 can be used to determine a probability of an individual or other entity exhibiting a type of future behavior. In a simplified example, the automated modeling system 128 can execute one or more algorithms for generating data indicative of a probability that an individual or other entity may default on a mortgage obligation, respond to a sales offer, etc.

In some aspects, the automated modeling system 128 can use the clustered data to accurately assess risks associated with individuals, organizations, and other entities. The analytical module 108 can create this clustered data, which can include segments or other clusters of data based on observed trends in one or more time series.

Figure 2:
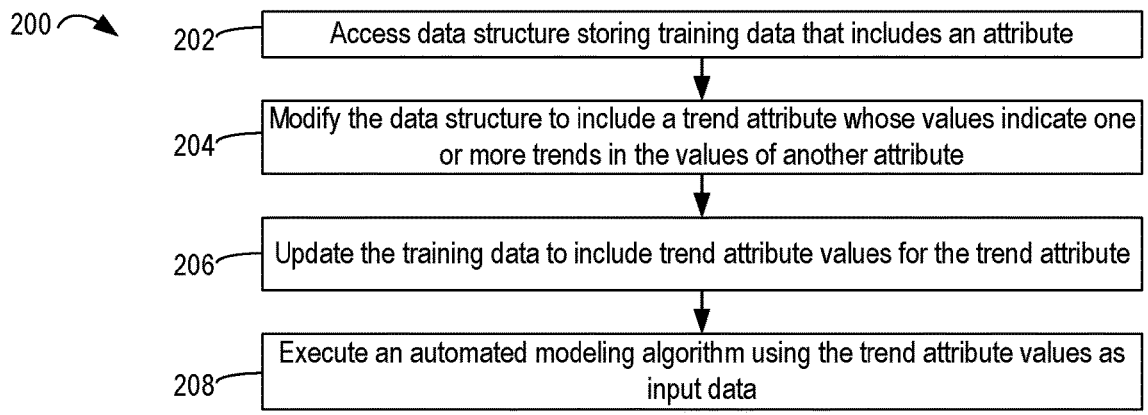
FIG. 2 depicts an example of a method for generating trend attributes to be used in an automated modeling algorithm, according to some aspects of the present disclosure.

The computing system 100 can generate trend attributes that are used as inputs to an automated modeling algorithm. For instance, FIG. 2 is a flow chart depicting an example of a method 200 for using trend attributes as inputs to an automated modeling algorithm. For illustrative purposes, the method 200 is described with reference to the implementation depicted in FIG. 1 and various other examples described herein. But other implementations are possible.

The method 200 can also involve accessing a data structure for storing training data that includes one or more attributes, as depicted in block 202. For example, the analytical module 108 can be executed by one or more suitable processing devices to access the training data 112. The training data 112 can be grouped into one or more attributes, such as the attributes 116 and 120. Any number of suitable attributes can be included in the training data 112. In one example, a set of training data 112 can include data samples for 500 or more attributes. In some aspects, the training data 112 also includes one or more response variables 124.

Figure 3:
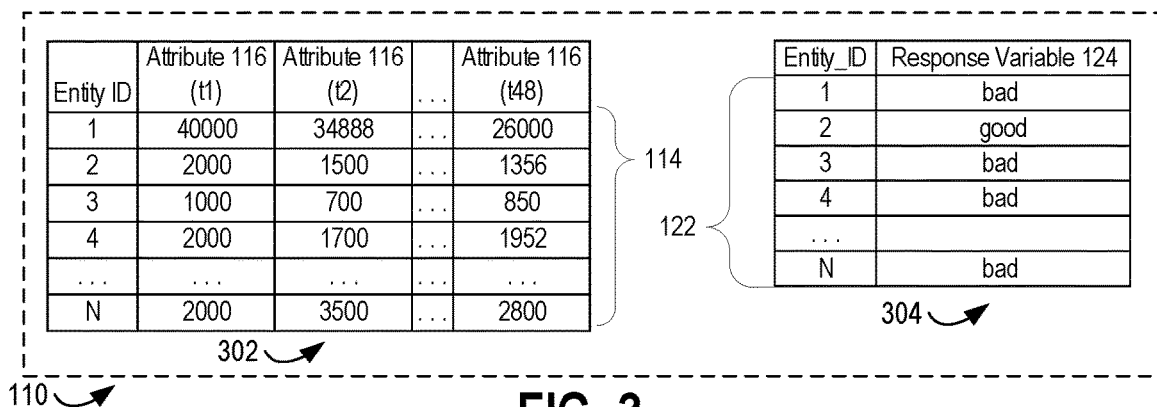
FIG. 3 depicts an example of a data structure that may be updated with trend attribute data using the method of FIG. 2, according to some aspects of the present disclosure.

FIG. 3 depicts an example of a data structure that may be accessed at block 202. In this example, the data structure is a database 110. The database 110 includes a table 302 with the data samples 114 and a table 304 with the data samples 122. The table 302 includes attribute values for multiple time series. Each time series corresponds to a given entity. For example, the first row in the table 302 corresponds to the entity 1 and includes attribute values for times $t_1, t_2 \ldots t_{48}$, the second row in the table 302 corresponds to the entity 2 and includes attribute values for times $t_1, t_2 \ldots t_{48}$, etc. The table 304 includes values of a response variable 124. For example, the first row in the table 304 corresponds to the entity 1 and indicates that the entity has a "bad" value for the response variable 124, the second row in the table 304 corresponds to the entity 2 and indicates that the entity has a "bad" value for the response variable 124, etc.

The data structure depicted in FIG. 3 is provided for illustrative purposes. Other data structures can be used. For example, a data structure can include any arrangement of fields or other data elements for storing an attribute value, an entity identifier associated with the attribute value, and a time value associated with one or more of the attribute value and the entity identifier.

Returning to FIG. 2, the method 200 can also involve modifying the data structure to include a trend attribute whose values indicate one or more trends in the values of another attribute, as depicted in block 204. The analytical module 108 can be executed by one or more processing devices to generate a trend attribute 125 from one or more of the attributes 116, 120. Examples of creating trend attributes are described herein with respect to FIGS. 5 and 6.

In some aspects, a trend attribute is a statistical attribute for a time series. Examples of statistical attributes include an average value for the time series, a maximum value for the time series, a minimum value for the time series, a range for the time series, and a difference between the most recent observation and oldest observation. Additional examples of statistical attributes include a slope of a least squares line for the time series, a sum of squared differences between the least square line and actual observations (e.g., cluster centers) for the time series, a sample standard deviation for the time series, and a sample variance for the time series.

The analytical module 108 can compute statistical attributes for multiple time windows. For example, the training data 112 may include data samples over a period of 48 months. In some aspects, the analytical module 108 can use a time window of twelve months for computing a statistical attribute. If a twelve-month window is used, the analytical module 108 can compute four values of the statistical attribute for four windows, respectively (e.g., months 1-6, 7-12, 13-18, 19-24, 25-30, 31-36, 37-42, and 43-48). In other aspects, the analytical module 108 can use a time window of six months for computing a statistical attribute. If a six-month window is used, the analytical module 108 can compute eight values of the statistical attribute for eight windows, respectively (e.g., months 1-12, 13-24, 25-36, 37-48). In other aspects, the analytical module 108 can use a time window of twelve months for computing a statistical attribute. If twelve-month window is used, the analytical module 108 can compute two values of the statistical attribute for two windows, respectively (e.g., months 1-24 and 25-48). In some aspects, the analytical module 108 can compute multiple statistical attributes for different time windows (e.g., computing a first set of statistical attribute values using six-month windows, computing a first set of statistical attribute values using twelve-month windows, etc.).

Another example of a trend attribute is sample skewness. The analytical module 108 can compute the sample skewness for some or all of a time period covered by the training data 112 (e.g., an entire 48-month period.) The analytical module 108 can compute the sample skewness using a time series that includes actual observations and that omits a predicted linear trend (e.g., best-fit least square line).

Figure 7:
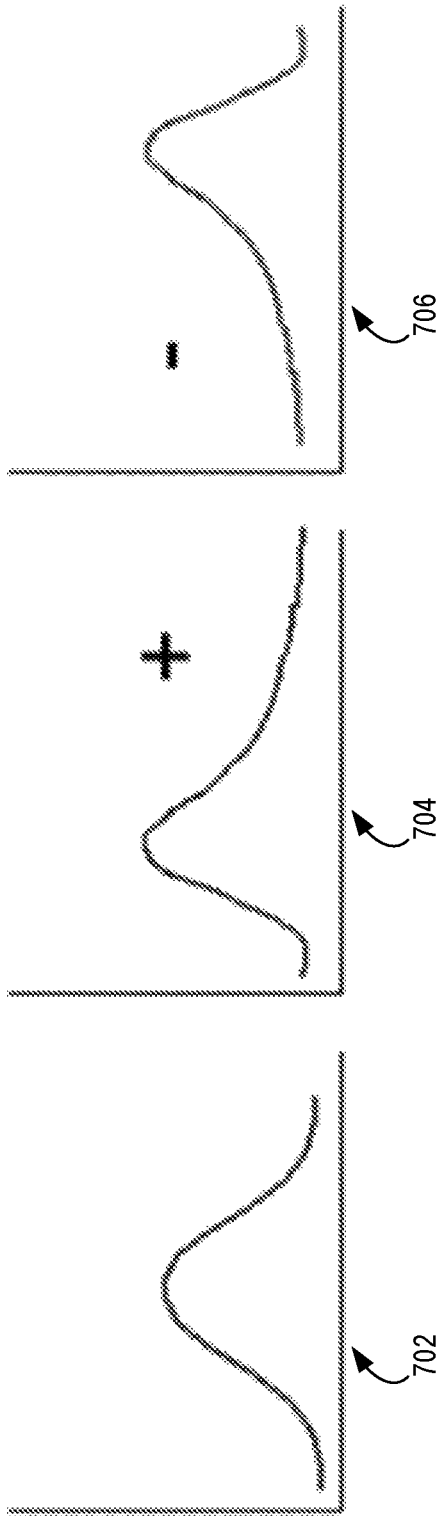
FIG. 7 depicts examples of skewed data distributions whose skewness may be used as a trend attribute in the methods of FIGS. 2 and 6, according to some aspects of the present disclosure.

The sample skewness represents a measure of asymmetry (e.g., "lopsidedness") in a probability distribution of the time series. For instance, FIG. 7 depicts examples of a normal distribution 702 of data values, a distribution 704 of data values that are positively skewed, and a distribution 706 of data values that are negatively skewed. In some aspects, the skewness can be used to represent certain behaviors indicative of risk. In a simplified example involving credit-related data, a high-risk consumer might have more high balance months than low balance months. A low-risk consumer might have more low balance months than high balance months. A skewness measure may represent such differences in spending behaviors.

An example of a formula for computing sample skewness in a time series $x_i$ having length n (i.e., i=1, . . . , n) is provided below.

$$\text{skewness} = \frac{n^2}{(n-1)(n-2)} \frac{m_3}{s^3}$$

The variable $s^3$ represents the cubed standard deviation of the time series. The cubed standard deviation $s^3$ can be calculated using the formula below.

$$s^3 = \left[ \frac{1}{n-1} \sum_{i=1}^{n} (x_i - \bar{x})^2 \right]^{3/2}$$

The variable $m_3$ represents the third central moment of a probability distribution of the cluster. The third central moment can be calculated using the formula below.

$$m_3 = \frac{1}{n} \sum_{i=1}^{n} (x_i - \bar{x})^3$$

Figure 8:
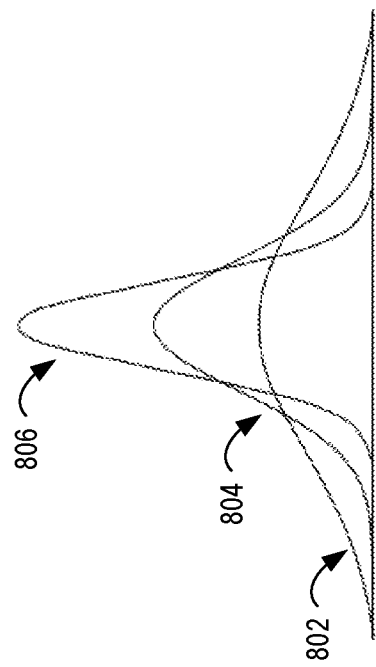
FIG. 8 depicts examples of skewed data distributions whose excess kurtosis may be used as a trend attribute in the method of FIGS. 2 and 6, according to some aspects of the present disclosure.

Another example of a trend attribute is excess kurtosis. The excess kurtosis is the sharpness of the peak of a distribution of cluster time-series values. For example, FIG. 8 depicts examples of distributions 802, 804, 806. The distribution 802 exhibits negative kurtosis, and therefore has a flatter peak as compared to the distributions 804, 806. The distribution 806 exhibits positive kurtosis, and therefore has a sharper peak as compared to the distributions 802, 804. The distribution 804 is a normal distribution. A distribution with heavy and thick tail can indicate that "tail" events are more likely. In an example that involves using credit-related data to assess risk, entities with nearly equal numbers of high balance months and low balance months might have a different risk profile than entities with all high balance months. The excess kurtosis measure can be used to distinguish risk levels among near or sub-prime entities.

The analytical module 108 can compute the sample kurtosis for some or all of a time period covered by the training data 112 (e.g., an entire 48-month period.) An example of a formula for computing kurtosis is provided below.

$$\text{excess kurtosis} = \frac{n(n+1)}{(n-1)(n-2)(n-3)} \frac{\sum_{i=1}^{n}(x_i - \bar{x})^4}{\left(\sum_{i=1}^{n}(x_i - \bar{x})^2\right)^2} - 3\frac{(n-1)^2}{(n-2)(n-3)}$$

This formula provides the kurtosis of a series $x_i$, for i=1, . . . , n, which represents a time series of length n.

In some aspects, a trend attribute is computed based on the local peaks and valleys within a time series. A peak can be a point prior to which two time periods have consecutive increasing values and after which two time periods have consecutive decreasing values. For example, in a time window of multiple months, a peak can be a point having two prior months of consecutive increase followed by two months of consecutive decrease. A valley can be a point prior to which two time periods have consecutive decreasing values and after which two time periods have consecutive increasing values. For example, in a time window of multiple months, a valley can be a point having two prior months of consecutive decrease followed by two later months of consecutive increase. In some aspects, these attributes may be calculated only when at least one peak and at least one valley are present.

Examples of attributes that can be computed based on the presence of peaks and valleys include magnitude attributes, frequency attributes, duration attributes computed based on peaks and valleys in a time series, and depression/recovery rate attributes computed based on rates of change between peaks and valleys in a time series. Examples of magnitude attributes include average peak value, maximum peak value, minimum peak value, average valley value, maximum valley value, minimum valley value, average consecutive peak-to-valley difference, maximum consecutive peak-to-valley difference, and minimum consecutive peak-to-valley difference. Examples of frequency attributes include a total number of peaks, a total number of valleys, a total number of peaks minus total number of valleys, and a ratio between total number of peaks and total number of valleys. Examples of duration attributes include an average time between consecutive peaks, a maximum time between consecutive peaks, a minimum time between consecutive peaks, an average time between consecutive valleys, a minimum time between consecutive valleys, a maximum time between consecutive valleys, an average time between consecutive peak and valley, a minimum time between consecutive peak and valley, a maximum time between consecutive peak and valley, a time since the maximum peak, and a time since the minimum peak. Examples of depression/recovery rate attributes include an average depression rate and an average recovery rate. A depression rate can be the slope of an interval between a peak and the following consecutive valley. A recovery rate can be the slope of an interval between a valley and the following consecutive peak.

Returning to FIG. 2, the method 200 can also involve updating the training data to trend attribute values for the trend attribute, as depicted in block 206. The analytical module 108 can be executed by one or more processing devices to compute values of a trend attribute 125. The analytical module 108 can access a non-transitory computer-readable medium on which the training data 112 is stored. The analytical module 108 can update the training data 112 to include the computed values of the trend attribute 125.

Figure 4:
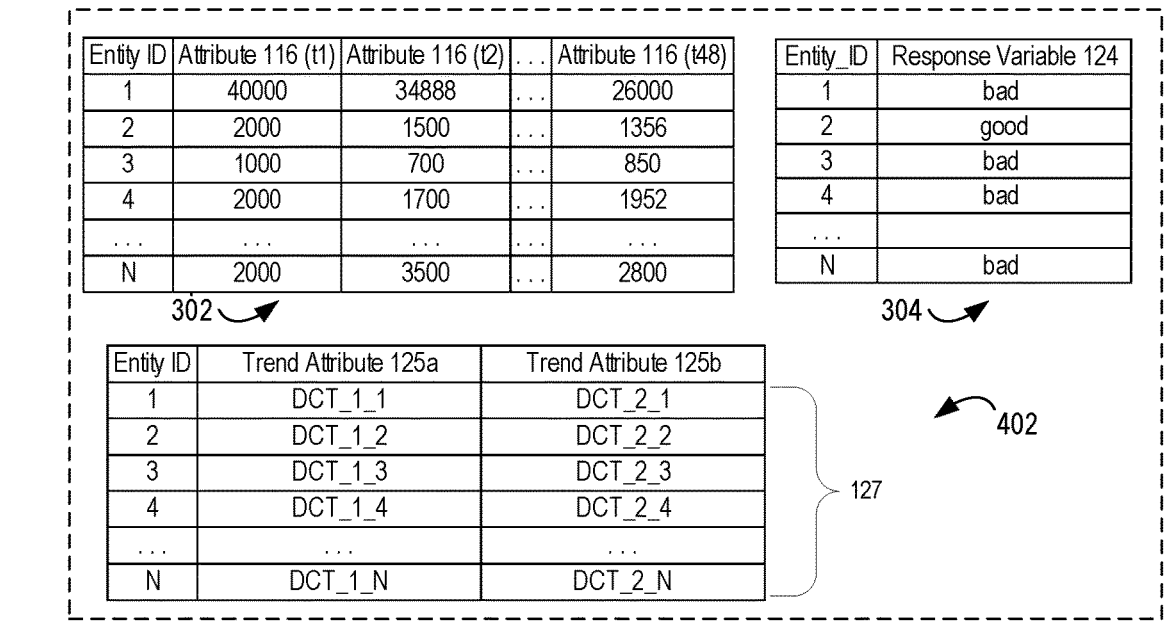
FIG. 4 depicts an example of the data structure of FIG. 3 that has been updated with trend attribute data using the method of FIG. 2, according to some aspects of the present disclosure.

FIG. 4 depicts an example of a data structure that has been modified at block 204 and 206 to include a trend attribute and its associated trend attribute values. In this example, the data structure is the database 110. The database 110 has been modified to include an additional table 402. The table 402 can include one or more trend attributes (e.g., a trend attribute 125a, a trend attribute 125b, etc.) and associated attribute values.

One example of a trend attribute is a discrete cosine transformation ("DCT") coefficient or another coefficient generated using a frequency transform. In the example depicted in FIG. 4, the analytical module 108 performs a DCT for each of the time series in the table 302. A DCT outputs a set of coefficients. The analytical module 108 can select one or more of the coefficients as trend attributes, with the coefficient value being the trend attribute value.

In the example depicted in FIG. 4, the analytical module 108 selects the first two DCT coefficients as the trend attributes. For illustrative purposes, FIG. 4 depicts the coefficient values for first two DCT coefficients of the first entity as "DCT_1_1" and "DCT_2_1," the coefficient values for first two DCT coefficients of the second entity as "DCT_1_2" and "DCT_2_2," etc.

Returning to FIG. 2, the method 200 can also involve executing the automated modeling algorithm using the trend attribute values as input data, as depicted in block 208. In some aspects, executing the automated modeling algorithm can involve training the automated modeling algorithm using at least some of the training data 112, including the trend attribute values. For example, the analytical module 108 can be executed by one or more processing devices to output a training dataset that includes values of the trend attribute 125. The computing environment 106 can transmit the training data 112 to the automated modeling system 128. The automated modeling system 128 can train an automated modeling algorithm (e.g., a modeling algorithm using logistic regression, a neural network, a support vector machine, etc.) using portions of the training data 112 for the trend attribute 125. In some aspects, the automated modeling system 128 can train the automated modeling algorithm using one or more of the attributes 116, 120 in addition to one or more trend attributes 125.

Figure 5:
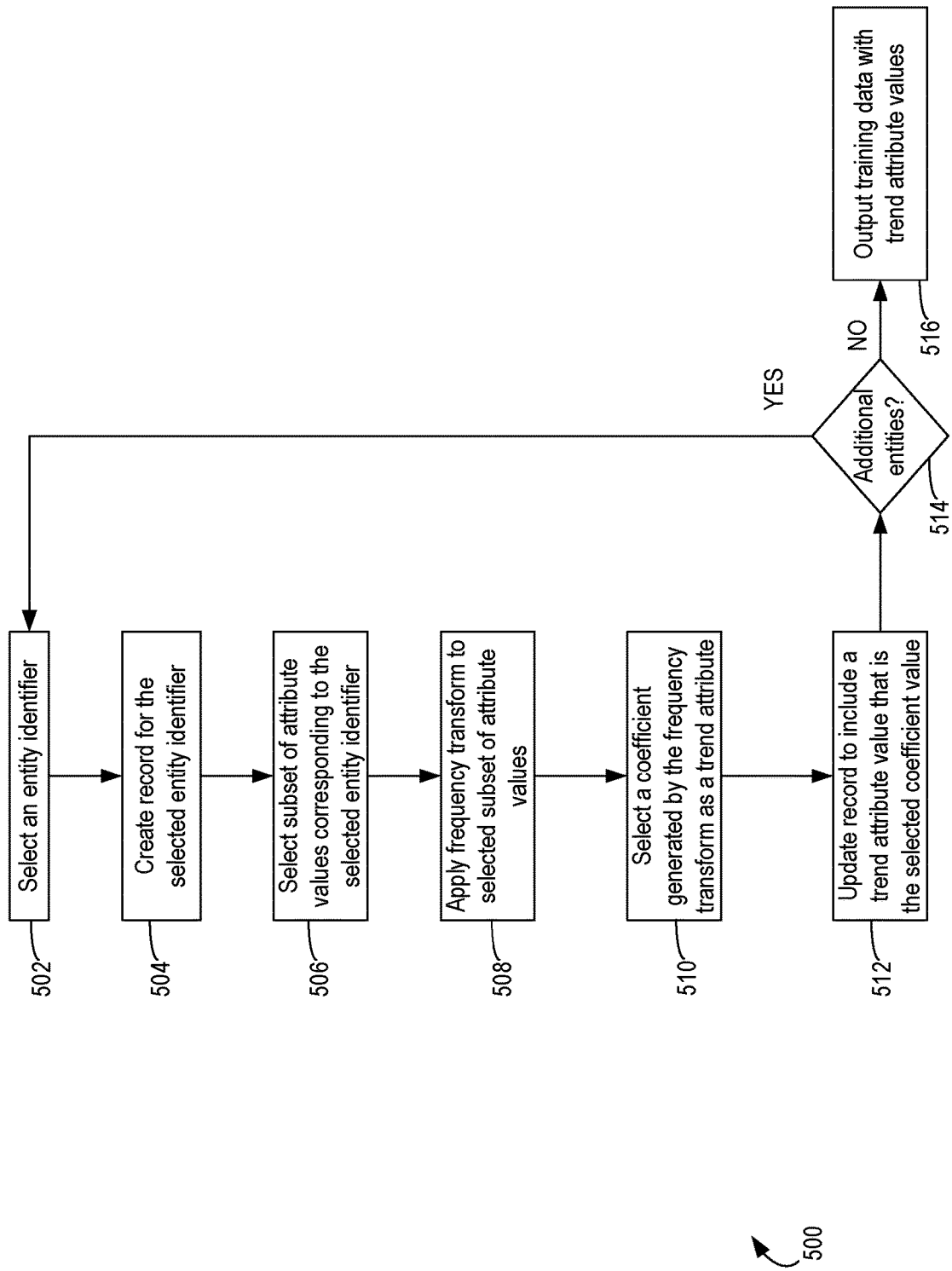
FIG. 5 depicts an example of a method for using a frequency transform to generate trend attribute data, according to some aspects of the present disclosure.

In some aspects, trend attributes can include coefficients that are obtained from a DCT or other frequency transform. For example, FIG. 5 is a flow chart depicting an example of a method 500 for using a frequency transform to generate trend attribute data. For illustrative purposes, the method 500 is described with reference to the implementation depicted in FIGS. 1-4 and various other examples described herein. But other implementations are possible.

The method 500 can be performed using some or all of the training data 112. For example, the method 500 can be applied to a random sample of entity data (e.g., training data 112 that includes data samples for 2.5 million entity identifiers). In this example, the random sample may include credit data or other transaction data for a suitable time period (e.g., 48 months) divided into suitable intervals (e.g., months, weeks, days, etc.).

The method 500 can involve selecting an entity identifier, as depicted in block 502. The analytical module 108 can be executed by one or more suitable processing devices to select an entity identifier. Selecting the entity identifier can include accessing the training data 112 from a non-transitory computer-readable medium, identifying one or more entity identifiers in the data samples of the training data 112, and selecting one or more of the entity identifiers. For instance, the analytical module 108 can access the table 302 depicted in FIG. 3 and select an entity having an entity identifier of "1."

The method 500 can also involve creating a record for the selected entity identifier, as depicted in block 504. The record can be used to store one or more trend attribute values for the selected entity identifier. The analytical module 108 can be executed by one or more suitable processing devices to create the record. For instance, the analytical module 108 can access a non-transitory computer-readable medium in which the database 110 is stored. The analytical module 108 can create the table 402 depicted in FIG. 4, generate a new record in the table 402, or both. The analytical module 108 can update the record to include the selected entity identifier (e.g., an identifier for the entity 1).

The method 500 can also involve selecting a subset of attribute values corresponding to the selected entity identifier, as depicted in block 506. The analytical module 108 can be executed by one or more suitable processing devices and thereby select the subset of attribute values. Continuing with the example above, the subset of attribute values for the entity 1 can be selected. This subset of attribute values includes the row of attribute values for entity 1 (e.g., the values of attribute 116 at times $t_1, t_2 \ldots t_{48}$).

The method 500 can also involve applying a frequency transform to the respective subset of attribute values, as depicted in block 508. The analytical module 108 can be executed by one or more suitable processing devices and can thereby apply the frequency transform to the selected attribute values. Performing the frequency transform on a given dataset can transform a time-domain dataset into a frequency-domain dataset. For example, applying a frequency transform to a time series for the attribute 116, which includes a set of values in the time domain (e.g., attribute values at times $t_1, t_2 \ldots t_{48}$), can involve computing a corresponding set of coefficient values for the frequency domain.

In some aspects, the analytical module 108 can apply a DCT and thereby compute DCT coefficients. One or more DCT coefficients can indicate trends and variations in a time series at different periodic time scales. For example, a series of length n can be used to compute a set of n DCT coefficients. These DCT coefficients may exhibit little to no correlation with one another. DCT coefficients that exhibit little to no correlation can be used as inputs to an automated modeling algorithm. In some aspects, the analytical module 108 can modify a time series with missing data values (e.g., months in which data is not available) by imputing the missing values via interpolation or another suitable process prior to the calculation of DCT coefficients.

In some aspects, the values of one or more DCT coefficients can indicate periodic features of the time series from which the DCT coefficients were computed. For instance, one or more DCT coefficients can indicate the strength of various cyclic patterns within the data values of the time series. A first DCT coefficient can describe the average attribute value for the time series. Other DCT coefficients can describe the relative strength of the cycles for the corresponding time period.

In one example, the attribute-creation engine can calculate the first five DCT coefficients for an attribute having a 48-month time series of attribute data values. The first DCT coefficient can indicate the average of the 48-month time series. The second DCT coefficient can indicate a trend with respect to variations that occur every 96 months. The third DCT coefficient can indicate a trend with respect to variations that occur every 48 months. The fourth DCT coefficient can indicate a trend with respect to variations that occur every 32 months. The fifth DCT coefficient can indicate a trend with respect to variations that occur every 24 months. Some or all of the computed DCT coefficients can be used as attributes for training an automated modeling algorithm.

In some aspects, the following formulas can be used to transform a time series into a set of DCT coefficients. A time series x(n) having N entries can be transformed into a series Y(k) having N entries in the frequency domain using the DCT formula below.

$$Y(k) = w(k) \sum_{n=1}^{N} x(n) \cos\left(\frac{\pi}{2N}(2n-1)(k-1)\right), k = 1, 2, \ldots N$$

In this example, n is a time index and k is a frequency index. The inverse DCT can be obtained using the formula below.

$$x(n) = \sum_{k=1}^{N} w(k) Y(k) \cos\left(\frac{\pi(2n-1)(k-1)}{2N}\right), n = 1, 2, \ldots N$$

In the DCT formula and the inverse DCT formula, the term w(k) is calculated using the formula below.

$$w(k) = \begin{cases} \frac{1}{\sqrt{N}}, & k = 1 \\ \sqrt{\frac{2}{N}}, & 2 \le k \le N \end{cases}$$

The method 500 can also involve selecting at least one coefficient generated by the applied frequency transform a trend attribute, as depicted in block 510. The analytical module 108 can be executed by one or more suitable processing devices to select a DCT coefficient (or other coefficient obtained from a frequency transform) as a trend attribute. In some aspects, all computed DCT coefficients can be selected as trend attributes. In other aspects, one or more DCT coefficients can be selected as trend attributes based on which information may be more useful for training an automated modeling algorithm. For instance, in the example described above, the first five DCT coefficients may be selected by the analytical module 108 based on the usefulness of 96-month cyclic data, 48-month cyclic data, 32-month cyclic data, and 24-month cyclic data when training an automated modeling algorithm.

The method 500 can also involve updating the record with one or more trend attribute values that are obtained from the frequency transform, as depicted in block 512. The analytical module 108 can be executed by one or more suitable processing devices and can thereby update the database 110 with the trend attribute values. For example, the values for one or more coefficients obtained from the frequency transform can be used as the trend attribute values.

The method 500 can also involve determining whether the training data includes other entities without computed trend attribute values, as depicted in block 514. The analytical module 108 can be executed by one or more suitable processing devices to access the database 110 and determine if each entity in the training data 112 (or a relevant subset of the training data 112) has an associated value for a trend attribute. For instance, in the example depicted in FIG. 4, the analytical module 108 can determine if each entity identifier in table 302 has a corresponding record with trend attribute values in the table 402.

If the training data includes other entities without computed trend attribute values, the method 500 can return to block 502, select another entity identifier, and continue updating the training data via blocks 504-512. If the training data does not include other entities without computed trend attribute values, the method 500 can proceed to block 514.

At block 514, the method 500 can involve outputting training data with the trend attribute values for one or more trend attributes. For example, at block 514, the analytical module 108 can output the data samples 127, the table 402, or both. In some aspects, the analytical module 108 can cause a processing device to configure one or more communication devices (e.g., a network interface device, a local bus, etc.) in the computing environment 106 for transmitting the trend attribute values to an automated modeling system 128. In other aspects, the analytical module 108 can cause a processing device to configure one or more presentation devices (e.g., a touchscreen, a monitor, etc.) in the computing environment 106 for displaying the trend attribute values.

Figure 6:
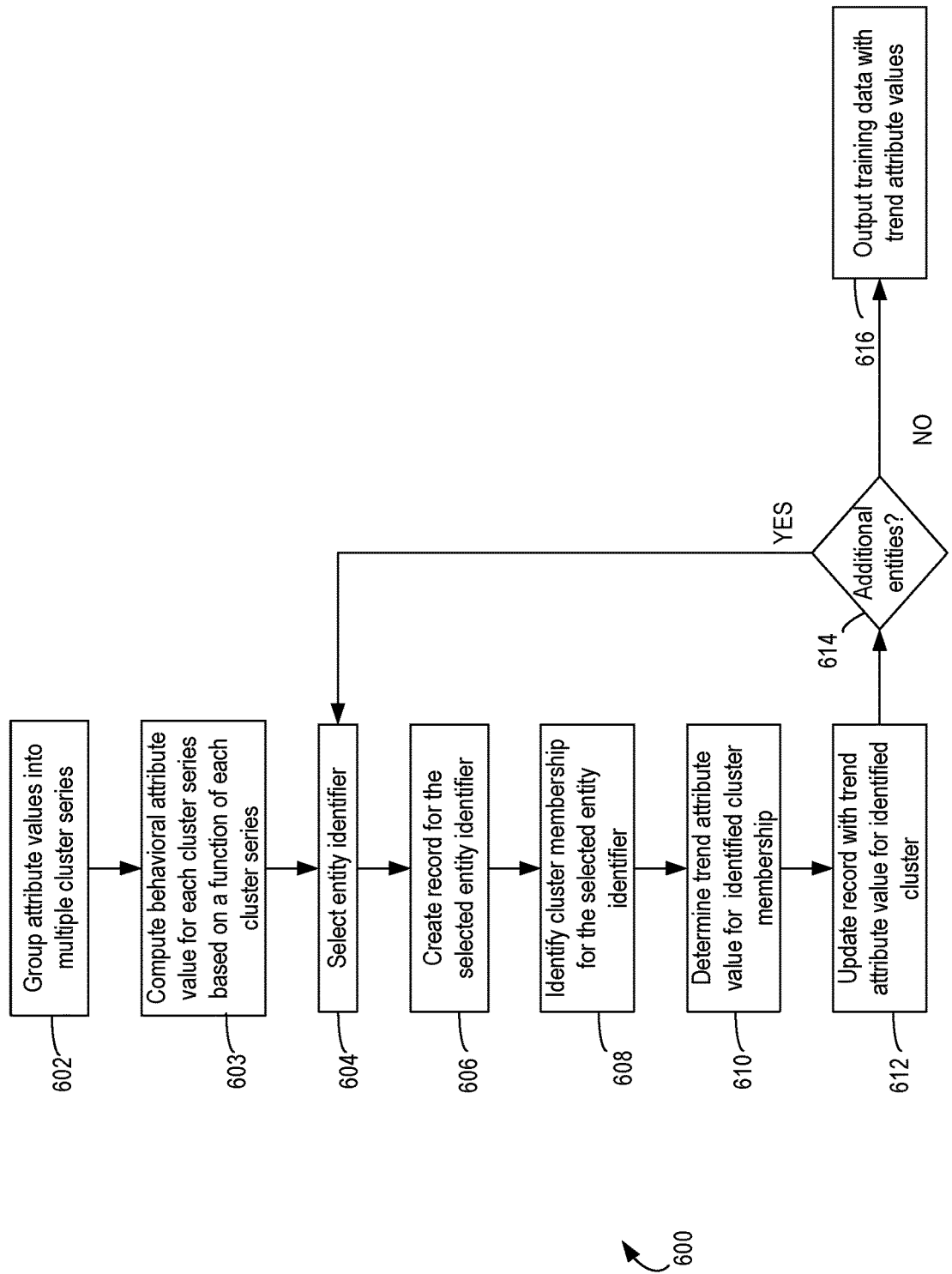
FIG. 6 depicts an example of a method for using clustered attribute values to generate trend attribute data, according to some aspects of the present disclosure.

In additional or alternative aspects, other trend attributes besides DCT coefficients (or other coefficients from frequency transform) may be used the by the analytical module 108. For example, a trend attribute can be a categorical attribute indicating that a time-series for a given entity exhibits behavior that matches the behavior of various clusters generated by grouping attribute values. FIG. 6 is a flow chart depicting an example of a method 600 for using clustered attribute values to generate trend attribute. For illustrative purposes, the method 600 is described with reference to the implementation depicted in FIGS. 1-5 and various other examples described herein. But other implementations are possible.

The method 600 can be performed using some or all of the training data 112. For example, the method 600 can be applied to a random sample of entity data (e.g., training data 112 that includes data samples for 2.5 million entity identifiers). In this example, the random sample may include credit data or other transaction data for a suitable time period (e.g., 48 months) divided into suitable intervals (e.g., months, weeks, days, etc.).

The method 600 can also involve grouping attribute values into multiple cluster series, as depicted in block 602. The analytical module 108 can be executed by one or more suitable processing devices to generate each cluster series. A cluster series can be a time series of attribute values. In the cluster series, each time interval is associated with a respective cluster. Thus, a cluster series for a 48-month period can include 48 clusters for the 48 months, respectively.

The analytical module 108 can group the values of attribute 116, attribute 120, or both for a given month into one or more clusters. Each cluster can include attribute values corresponding to multiple entities. Any suitable method can be used to group individuals or entities into clusters. These grouping methods can allow the data in a time series to be grouped into clusters that exhibit behavior that is stable, increasing, decreasing, or slightly varying over time.

For example, the training data 112 can include values of the attribute 116 for different entities over a period of 48 months. These attribute values can be grouped into four cluster series. In the cluster series, the attribute values of the different entities can be grouped into a first set of four clusters for the first month, a second set of ten clusters for the second month, and so on. In this manner, four cluster series are generated, where each cluster series includes 48 clusters for respective months of the 48-month period. Cluster centers can be represented by, for example, a mean cluster value (e.g., a mean credit score in a cluster of credit scores).

In a simplified example, the method 600 can be used to cluster credit scores for various entities on a monthly basis over a 48-month period. The clustering operations can generate four cluster series. Each entry in a cluster series includes a mean credit score for the cluster in a particular month. The first cluster series can correspond to a cohort of entities who maintain average credit scores of approximately 820 over a four-year period. The second cluster series can correspond to a cohort of entities who maintain average credit scores of approximately 450 over the four-year period. The third cluster series can correspond to a cohort of entities that exhibits an increase in credit score from a near-prime range (around 650) to a prime range (around 720) over the four-year period. The fourth cluster series can correspond to a cohort of entities that exhibits a decrease in credit score from a prime range (around 720) to near-prime range (around 650) over the four-year period.

In some aspects, the values for each attribute can be separately clustered. For example, the analytical module 108 can execute a k-means clustering algorithm to group the values of attribute 116 into a first set of clusters. Additionally, the analytical module 108 can execute the k-means clustering algorithm to separately group the values of attribute 120 into a second set of clusters.

In additional or alternative aspects, the analytical module 108 can use a principal component analysis ("PCA") to cluster data corresponding to multiple attributes. For example, the analytical module 108 can compute one or more principal component datasets for a set of attribute values that includes the time-series data of the attribute 116 and the time-series data of the attribute 120. A principal component dataset, which is generated using a PCA, is a linear combination of vectors corresponding to the various time series to which the PCA is applied. In a simplified example, if a first time series has attribute values for the attribute 116 and a second time series has attribute values for the attribute 120, the first time series and the second time series can be used to generate standardized vectors (e.g., vectors in which the set of vector entries has a mean value of zero and a variance of one), where each standardized vector (e.g., the vectors $X_1$ to $X_n$) corresponds to one of the time series (e.g., the time series $x_1$, the time series $x_2$, and so on). A weighted sum of these standardized vectors is used to obtain a principal component dataset. In the PCA, a matrix formed from the set of standardized vectors (e.g., the vectors $X_1$ to $X_n$) is transformed into a matrix that includes a smaller set of principal component vectors (e.g., the vectors $PC_1$ to $PC_k$). Each principal component vector is a weighted combination of the vectors $X_1$ to $X_n$, where different weights are used for different principal component vectors. Through this transformation, the set of principal component vectors represents the data from the original vectors.

For instance, the training data 112 may include a first time series, which includes values of attribute 116 for multiple entities over a 48-month period, and a second time series, which includes attribute values of attribute 120 for multiple entities over a 48-month period. The analytical module 108 can represent the two time series as vectors $x_{1,i}$ and $x_{2,i}$ for a given entity i, generate standardized vectors $X_{1,i}$ and $X_{2,i}$, and perform a PCA on the standardized vectors $X_{1,i}$ and $X_{2,i}$. The PCA can output principal component vectors. The analytical module 108 can select one of the principal component vectors (e.g., the first principal component vector) as the time-series whose values are to be clustered for the entity i. In this manner, the analytical module 108 can compute principal component vectors for each of the entities identified in the training data being analyzed. At block 602, the vector entries for a given time index of the principal component vectors (e.g., the vector entries for the first month of a 48-month period) are clustered.

In additional or alternative aspects, values for an attribute can be clustered based on one or more suitable characteristics of a time series for the attribute. For example, if an attribute 116 or 120 includes a time-series over a 48-month period, the analytical module 108 can compute one or more characteristics for the time series and use the computed characteristics as inputs to a k-means clustering algorithm or other suitable algorithm. In some aspects, these characteristics include linear fit statistics (e.g., slope, intercept, and standard error). In additional or alternative aspects, these characteristics include DCT coefficients or other coefficients obtained from a frequency transform. DCT coefficients (or other coefficients obtained from a frequency transform) can be computed using one or more operations described above with respect to FIG. 5.

The method 600 can also involve computing, for each cluster series, one or more behavioral attribute values, where each behavioral attribute value is computed using a function of the cluster series, as depicted in block 603. The analytical module 108 can be executed by one or more suitable processing devices to compute the behavioral attribute values for multiple cluster series. Examples of behavioral attributes include one or more of the statistical attributes described above (e.g., slope of least squares line, sum of squared differences between the least square line and cluster centers, standard deviation, variance, etc.), skewness calculated using representative cluster values (e.g., cluster centers), kurtosis calculated using representative cluster values (e.g., cluster centers), peak-and-valley attributes, etc.

The cluster series and associated behavioral attribute values computed at block 603 can be used to obtain trend attribute values for different entities in the training data 112. To do so, the method 600 can involve selecting an entity identifier, as depicted in block 604. The analytical module 108 can be executed by one or more suitable processing devices to access the training data 112 and to select an entity identifier from the training data 112. For instance, in the example depicted in FIG. 3, an entity identifier of "1" can be selected.

The method 600 can also involve creating a record for the selected entity identifier, as depicted in block 606. The record can be used to store one or more trend attribute values for the selected entity identifier. The analytical module 108 can be executed by one or more suitable processing devices to create the record. For instance, in the example depicted in FIG. 4, a new table 402, a new record in the table 402, or both can be created by the analytical module 108.

The method 600 can also involve identifying a cluster membership for the selected entity identifier, as depicted in block 608. The analytical module 108 can be executed by one or more suitable processing devices to identify an entity's cluster membership. For instance, the analytical module 108 can determine that a time series of attribute values for an entity with identifier "1" exhibit similar behavior (e.g., slope, skewness, kurtosis, etc.) as the behavioral attribute for a given cluster series. For example, the analytical module 108 can access a table or other data file used by a processing device during the method 600 to store various output values (e.g., identifications of cluster series, cluster memberships, computed behavioral attribute values, etc.). The analytical module 108 can use the data file to identify a behavioral attribute value corresponding to a particular cluster series and compare the behavioral attribute value (a behavior for a cluster series of balance values, income values, credit score values, etc.) to the behavior of the entity's time series for that attribute (e.g., balance, income, credit score, etc.).

The method 600 can also involve determining a trend attribute value for the identified cluster membership for the selected entity identifier, as depicted in block 610. The analytical module 108 can be executed by one or more suitable processing devices to identify the trend attribute value that was computed at block 602 for a given cluster series. The analytical module 108 can assign the entity to the cluster based on the similarity between the behavior of the entity's time series and the behavior of the cluster series. The entity's cluster membership can be used as a trend attribute, where an identifier of the cluster membership is used as the trend attribute value.

The method 600 can also involve updating the record with one or more trend attribute values that are determined for the identified cluster, as depicted in block 612. The analytical module 108 can be executed by one or more suitable processing devices to access the database 110 and can thereby update the database 110 with the trend attribute values. For example, a cluster membership value can be added to the database 110 as the trend attribute value.

The method 600 can also involve determining whether the training data includes other entities that have not been associated with trend attribute values, as depicted in block 614. For instance, the analytical module 108 can access the database 110 and determine if each entity in the training data 112 (or a portion of the training data 112 under consideration) has been associated with a trend attribute value. If the analytical module 108 identifies additional entities without associated trend attribute values, the method 600 can return to block 604, where the analytical module 108 selects an entity without an associated trend attribute value and the method 600 proceeds as described above.

If the analytical module 108 does not identify additional entities without associated trend attribute values, the method 600 can proceed to block 616. At block 616, the method 600 can involve outputting training data having trend attribute values. For example, the analytical module 108 can output training data 112 that has been updated with trend attribute values in a manner similar to that described above with respect to block 516 of FIG. 5.

In some aspects, the clusters generated using method 600 can be used in segmentation logic of an automated modeling algorithm. Training or otherwise executing the automated modeling algorithm can include executing segmentation logic based on values of the trend attribute. For example, segmentation logic can include an expression that defines the conditions on which a given modeling function will be selected to generate an analytical or predictive output (e.g., a score that is calculated using the automated modeling algorithm). If input data (e.g., the training data 112) to an automated modeling algorithm has first data items with a first trend attribute value, a first modeling function (e.g., a first decision tree) can be applied to the first data items. If the input data has second data items with a second trend attribute value, a second modeling function (e.g., a second decision tree) can be applied to the second data items.

In a simplified example involving segmentation, an automated modeling algorithm can use different decision trees to develop different predictions of card usage. For instance, a first decision tree may be developed using a "thick" credit file (e.g., a credit file having a number of tradelines that exceeds a threshold number). A second decision tree may be developed using a "thin" credit file (e.g., a credit file having a number of tradelines that is less than the threshold number). Modeling logic in an automated modeling algorithm can obtain a prediction of card usage from one of the decision trees and use the prediction to develop a spending estimate.

For instance, during an execution of the automated modeling algorithm, a particular decision tree can be selected based on whether a credit file to be used is a thin file or a thick file. The determination of whether a credit file to be used is a thin file or a thick file can be performed based on a consumer's number of open accounts as of certain date, prime/near-prime/sub-prime segmentation based on a consumer's credit score as of certain date, etc. For example, if a consumer (i.e., an entity) belongs to a cluster corresponding to a first number of open accounts as of a certain month, the consumer may be classified into a "thin file" segment. If the consumer belongs to a cluster corresponding to a second number of open accounts as of that month, the consumer may be classified into a "thick file" segment.

In some aspects, clusters of attribute values can be iteratively generated based on the attribute values for a given interval in a time period. For instance, the analytical module 108 can iteratively perform a first k-means clustering operation (or other clustering operation) on attribute values for a first month in a 48-month period, perform a second k-means clustering operation (or other clustering operation) on attribute values for a first month in a 48-month period, etc.

Figure 9:
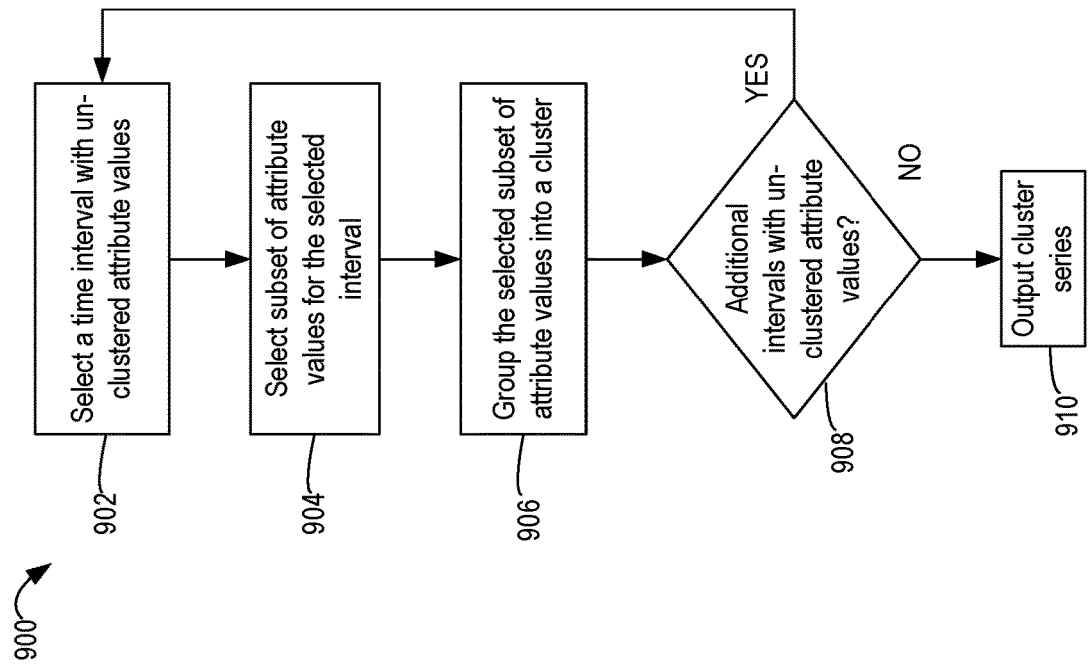
FIG. 9 depicts a method for iteratively clustering attribute values to generate one or more cluster series from which trend attributes can be calculated, according to some aspects of the present disclosure.

FIG. 9 depicts a method 900 for iteratively clustering attribute values. In some aspects, the method 900 can be used by the analytical module 108 to implement block 602 of FIG. 6. For illustrative purposes, the method 900 is described with reference to the implementation depicted in FIGS. 1-7 and various other examples described herein. But other implementations are possible.

The method 900 can involve selecting a time interval for which attribute data values have not been clustered, as depicted in block 902. The analytical module 108 can be executed by one or more suitable processing devices to select a time interval. For example, if the training data 112 includes data samples for a period of 48 months, the analytical module 108 selects a suitable time interval (e.g. a month) from the 48-month period.

The method 900 can also involve selecting a subset of attribute values for the selected interval, as depicted in block 904. The analytical module 108 can be executed by one or more suitable processing devices to select the subset of attribute values. For example, the training data 112 may include data samples 114, 118 for a period of 48 months. The data samples 114, 118 include attribute values for attributes 116, 120, respectively. At block 904, the analytical module 108 can select, for one of the 48 months, a subset of the data samples 114, a subset of the data samples 118, or both.

The method 900 can also involve grouping the selected subset of attribute values into a cluster, as depicted in block 906. The analytical module 108 can be executed by one or more suitable processing devices to generate the cluster. Continuing with the example above, the analytical module 108 can group the values of attribute 116, attribute 120, or both for a given month into one or more clusters. Each cluster can include attribute values corresponding to multiple entities. Any suitable method can be used to group individuals or entities into clusters. These grouping methods can allow the data in a time series to be grouped into clusters that exhibit behavior that is stable, increasing, decreasing, or slightly varying over time.

In some aspects, the values for each attribute can be separately clustered. For example, the analytical module 108 can execute a k-means clustering algorithm to group the values of attribute 116 into a first set of clusters, to group the values of attribute 120 into a second set of clusters, etc. In additional or alternative aspects, the analytical module 108 can analyze multiple attributes for clustering. For example, the analytical module 108 can compute one or more principal component datasets for a set of attribute values that includes the time-series data attribute 116 and the time-series data attribute 120, as described above with respect to FIG. 6.

The method 900 can also involve determining whether additional intervals have un-clustered attribute values, as depicted in block 908. The analytical module 108 can be executed by one or more suitable processing devices to determine whether additional intervals have un-clustered attribute values. If additional intervals have un-clustered attribute values, the method 900 can return to block 902, where an interval with un-clustered attribute values is selected and the method 900 proceeds as described above.

If no additional intervals have un-clustered attribute values, the method 900 can proceed to block 910. At block 910, the analytical module 108 can output multiple cluster series that have been iteratively generated using via the blocks 902-906.

Any suitable automated modeling algorithms or other analytical algorithms can use trend attributes as described herein. In some aspects, one or more of the automated modeling system 128 and the analytical module 108 can perform operations involving predictive analytics using the training data 112. For example, the analytical module 108 can use clusters obtained with a 48-month time series, along with one or more trend attributes, to predict whether a given entity will be moved from its current cluster to another cluster over a subsequent 24 months. Based on the cluster and descriptive attributes, the analytical module 108 predicts the behavior of the individual or entity.

Certain aspects described herein can allow multiple time series to be analyzed in relation to each other and for patterns of behavior of the individual or entity can be identified. For instance, a time series of credit scores and a time series of capacity scores can be used to evaluate how an individual or entity will perform in in various transactions. In some embodiments, the analytical module 108 can be used to analyze data involving circumstances in which an individual or entity may have different behaviors across multiple time series.

In one example, one or more of the analytical module 108 and the automated modeling system 128 can be used to identify, review, or otherwise analyze data about individuals who have a stable credit score (e.g., a first attribute) but a decreasing capacity score (e.g., a second attribute). A time series for the credit score attribute with relatively stable credit scores over time may indicate a lower degree of risk. But a time series for the capacity score attribute may indicate a higher degree of risk if the capacity score declines over time. The analytical module 108 can perform a DCT algorithm on both time series to generate a first trend attribute associated with the credit score attribute and a second trend attribute associated with the capacity score attribute. One or more of the analytical module 108 and the automated modeling system 128 can use the combination of the first trend attribute, which indicates a stable credit score over time, and the second trend attribute, which indicates a declining capacity score over time, to generate a risk assessment indicating a higher degree of risk. The use of the trend attributes thus provides a more accurate risk assessment than would be available if the automated modeling system 128 used only a snapshot of a consumer's credit score and capacity score.

In some aspects, a computing system described herein can perform consumer-level predictive analytics. Two types of consumer-level predictive analytics that may be examined are the prediction of risk or market-based outcome measures and the prediction of cluster transition. (Other types of consumer-level predictive analytics can be envisioned, as well as various types of predictive analytics for other types of entities.) The prediction of risk or market-based outcome measures are use cases in which each consumer is assigned an outcome flag or outcome continuous measure. An outcome flag may be a binary indicator variable, such as good/bad or response/non-response. An example of outcome continuous measure is dollar loss. Predictive analytics predicts the outcome measure by extrapolating the observation point over a certain number of future time periods, such as the next 24 time periods. Standard regression, neural network, or other machine learning procedures can be applied to predict the outcomes.

Computing Environment Example

Figure 10:
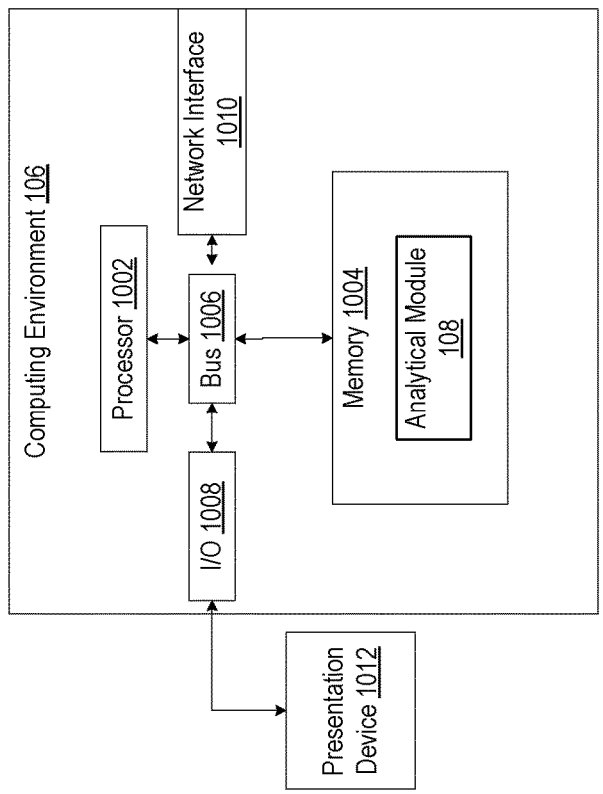
FIG. 10 depicts an example of a computing environment that can generate trend attributes to be used as inputs to an automated modeling algorithm, according to some aspects of the present disclosure.

Any suitable computing system or group of computing systems can be used to perform the attribute-creation operations described herein. For example, FIG. 10 is a block diagram depicting an example of a computing environment 106. The example of the computing environment 106 can include various devices for communicating with other devices in the computing system 100, as described with respect to FIG. 1. The computing environment 106 can include various devices for performing one or more of the operations described above with respect to FIGS. 1-9.

The computing environment 106 can include a processor 1002 that is communicatively coupled to a memory 1004. The processor 1002 executes computer-executable program code stored in the memory 1004, accesses information stored in the memory 1004, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 1002 include a microprocessor, an application-specific integrated circuit, a field-programmable gate array, or any other suitable processing device. The processor 1002 can include any number of processing devices, including one. The processor 1002 can include or communicate with a memory 1004. The memory 1004 stores program code that, when executed by the processor 1002, causes the processor to perform the operations described in this disclosure.

The memory 1004 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language.

The computing environment 106 may also include a number of external or internal devices such as input or output devices. For example, the computing environment 106 is shown with an input/output interface 1008 that can receive input from input devices or provide output to output devices. A bus 1006 can also be included in the computing environment 106. The bus 1006 can communicatively couple one or more components of the computing environment 106.

The computing environment 106 can execute program code that includes the analytical module 108. The program code for the analytical module 108 may be resident in any suitable computer-readable medium and may be executed on any suitable processing device. For example, as depicted in FIG. 10, the program code for the analytical module 108 can reside in the memory 1004 at the computing environment 106. Executing the analytical module 108 can configure the processor 1002 to perform the operations described herein.

In some aspects, the computing environment 106 can include one or more output devices. One example of an output device is the network interface device 1010 depicted in FIG. 10. A network interface device 1010 can include any device or group of devices suitable for establishing a wired or wireless data connection to one or more data networks 104. Non-limiting examples of the network interface device 1010 include an Ethernet network adapter, a modem, etc.

Another example of an output device is the presentation device 1012 depicted in FIG. 10. A presentation device 1012 can include any device or group of devices suitable for providing visual, auditory, or other suitable sensory output. Non-limiting examples of the presentation device 1012 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A server system comprising:
   a non-transitory computer-readable medium storing a data structure, the data structure comprising a table having training data for training an automated modeling algorithm, the training data comprising data items for a set of attribute values for multiple entities over a time period, wherein the table comprises entries mapping a respective attribute value for each of a plurality of attributes to a respective time value within the time period and an entity identifier for a respective entity associated with the respective attribute value; and a processing device communicatively coupled to the non-transitory computer-readable medium, wherein the processing device is configured for performing operations comprising:

generating, for each entity, at least one trend attribute that is a function of a respective time series of attribute values from the set of attribute values, the at least one trend attribute indicating a trend in the time series of attribute values, wherein generating the at least one trend attribute comprises:

(a) generating multiple cluster series, wherein each cluster series comprises clusters respectively associated with intervals in the time period, and wherein generating each cluster series comprises:

(i) grouping, for each interval, a respective subset of attribute values into a respective cluster based on the grouped attribute values being associated with time values in the interval, and (ii) adding the respective cluster for the interval to the cluster series; and (b) computing, for the multiple cluster series, respective behavioral attribute values, wherein each behavioral attribute value is computed as a function of the respective cluster series;

modifying the data structure to include the at least one trend attribute, wherein modifying the data structure includes storing an additional table to the data structure, the additional table comprising entries mapping the respective entity identifiers to a respective plurality of trend attribute values;

updating the training data to include trend attribute values of the at least one trend attribute for the respective entities, wherein updating the training data comprises, for at least some of the entities in the training data:

(a) identifying, for each entity, a respective cluster series having a respective behavioral attribute value that is similar to a respective behavior of a respective time series of attributes values for the entity, (b) assigning a cluster membership to the entity based on the respective behavioral attribute value being similar to the respective behavior of the respective time series of attribute values for the entity, and selecting, for the entity, an identifier of the cluster membership as a trend attribute value for the entity, wherein the updated training data comprises first data items having a first trend attribute value and second data items having a second trend attribute value, and training the automated modeling algorithm with the trend attribute values from the data structure, including:

executing segmentation logic, based on the trend attribute values;

applying, based on the segmentation logic and the first data items having the first trend attribute value, a first decision tree to the first data items, and applying, based on the segmentation logic and the second data items having the second trend attribute value, a second decision tree to the second data items, wherein the first decision tree was developed based on entities belonging to a first cluster and the second decision tree was developed based on entities belonging to a second cluster.

2. The server system of claim 1, wherein the processing device is configured for grouping the respective subset of attribute values into the respective cluster by performing operations comprising:

applying, for each entity, a frequency transform to attribute values associated with the entity; and grouping the respective subset of attribute values into the respective cluster based on at least one coefficient generated by the applied frequency transform.

3. The server system of claim 1, wherein the processing device is configured for grouping the respective subset of attribute values into the respective cluster by performing operations comprising:

identifying a first time series of attribute values for a first attribute and a second time series of attribute values for a second attribute;

performing a principal component analysis on the first time series and the second time series;

outputting a principal component data series from the principal component analysis; and grouping the principal component data series into the clusters.

4. The server system of claim 1, wherein the function of the respective time series uses changes in the respective time series over the time period to compute the trend attribute values, wherein the at least one trend attribute comprises at least one of:

a statistical attribute, a duration attribute computed based on peaks and valleys in the respective time series, or a depression/recovery attribute computed based on rates of change between the peaks and the valleys in the respective time series, a skewness of a probability distribution of the respective time series, or a kurtosis of a probability distribution of the respective time series.

5. A method comprising:

accessing a data structure comprising a table having input data for an automated modeling algorithm, the input data comprising data items with attribute values for multiple entities over a time period, wherein the table comprises entries mapping a respective attribute value for each of a plurality of attributes to a respective time value within the time period and an entity identifier for a respective entity associated with the respective attribute value;

generating, with a processing device, at least one trend attribute that is a function of a time series of attribute values, the at least one trend attribute indicating a trend in the time series of attribute values, wherein generating the at least one trend attribute comprises:

(a) generating multiple cluster series, wherein each cluster series comprises clusters respectively associated with intervals of the time period, and wherein generating each cluster series comprises:

(i) grouping, for each interval in the time period, a respective subset of attribute values into a respective cluster based on the grouped attribute values being associated with time values in the interval, and (ii) adding the respective cluster for the interval to the cluster series; and (b) computing, for the multiple cluster series, respective behavioral attribute values, wherein each behavioral attribute value is computed as a function of the respective cluster series;

modifying, with the processing device, the data structure to include the at least one trend attribute, wherein modifying the data structure includes storing an additional table to the data structure, the additional table comprising entries mapping the respective entity identifiers to a respective plurality of trend attribute values;

updating, with the processing device, the input data to include trend attribute values for the at least one trend attribute, for the respective entities, wherein updating the input data comprises, for at least some of the entities in the input data:
  (a) identifying, for each entity, a respective cluster series having a respective behavioral attribute value that is similar to a respective behavior of a respective time series of attributes values for the entity,
  (b) assigning a cluster membership to the entity based on the respective behavioral attribute value being similar to the respective behavior of the respective time series of attribute values for the entity, and
  (c) selecting, for the entity, an identifier of the cluster membership as a trend attribute value for the entity, wherein the updated training data comprises first data items having a first trend attribute value and second data items having a second trend attribute value, and training the automated modeling algorithm with the trend attribute values from the data structure, including:
  executing segmentation logic, based on the trend attribute values;
  applying, based on the segmentation logic and the first data items having the first trend attribute value, a first decision tree to the first data items, and
  applying, based on the segmentation logic and the second data items having the second trend attribute value, a second decision tree to the second data items,
  wherein the first decision tree was developed based on entities belonging to a first cluster and the second decision tree was developed based on entities belonging to a second cluster; and outputting, with the processing device, the trend attribute values from the data structure to a computing system that executes the automated modeling algorithm.

6. The method of claim 5, wherein the input data comprises training data for the automated modeling algorithm, wherein the method further comprises training the automated modeling algorithm using the trend attribute values in the training data.

7. The method of claim 5, wherein grouping the respective subset of attribute values into the respective cluster comprises:
  identifying a first time series of attribute values for a first attribute and a second time series of attribute values for a second attribute;
  performing a principal component analysis on the first time series and the second time series;
  outputting a principal component data series from the principal component analysis; and
  grouping the principal component data series into the clusters.

8. The method of claim 5, wherein the function of the respective time series uses changes in the respective time series over the time period to compute the trend attribute values, wherein the at least one trend attribute comprises at least one of:

a statistical attribute,
a duration attribute computed based on peaks and valleys in the respective time series, or a depression/recovery attribute computed based on rates of change between the peaks and the valleys in the respective time series,
a skewness of a probability distribution of the respective time series, or
a kurtosis of a probability distribution of the respective time series.

9. A non-transitory computer-readable medium having program code that is executable by a processing device to cause a computing device to perform operations, the operations comprising:
  accessing a data structure having training data for training an automated modeling algorithm, the training data comprising a table comprising data items with attribute values for multiple entities over a time period, wherein the table comprises entries mapping a respective attribute value for each of a plurality of attributes to a respective time value within the time period, and an entity identifier for) a respective entity associated with the respective attribute value;
  generating at least one trend attribute that is a function of a time series of attribute values, the at least one trend attribute indicating a trend in the time series of attribute values, wherein generating the at least one trend attribute comprises:
    (a) generating multiple cluster series, wherein each cluster series comprises clusters respectively associated with intervals of the time period, and wherein generating each cluster series comprise:
      (i) grouping, for each interval in the time period, a respective subset of attribute values into a respective cluster based on the grouped attribute values being associated with time values in the interval, and
      (ii) adding the respective cluster for the interval to the cluster series; and
    (b) computing, for the multiple cluster series, respective behavioral attribute values, wherein each behavioral attribute value is computed as a function of the respective cluster series;
  modifying the data structure to include the at least one trend attribute, wherein modifying the data structure includes storing an additional table to the data structure, the additional table comprising entries mapping the respective entity identifiers to a respective plurality of trend attribute values;
  updating the training data to include trend attribute values for the at least one trend attribute for the respective entities, wherein updating the training data comprises, for at least some of the entities in the training data:
    (a) identifying, for each entity, a respective cluster series having a respective behavioral attribute value that is similar to a respective behavior of a respective time series of attributes values for the entity,
    (b) assigning a cluster membership to the entity based on the respective behavioral attribute value being similar to the respective behavior of the respective time series of attribute values for the entity, and
    (c) selecting, for the entity, an identifier of the cluster membership as a trend attribute value for the entity, wherein the updated training data comprises first data items having a first trend attribute value and second data items having a second trend attribute value, and training the automated modeling algorithm with the trend attribute values from the data structure, including:

executing segmentation logic, based on the trend attribute values;

applying, based on the segmentation logic and the first data items having the first trend attribute value, a first decision tree to the first data items, and applying, based on the segmentation logic and the second data items having the second trend attribute value, a second decision tree to the second data items, wherein the first decision tree was developed based on entities belonging to a first cluster and the second decision tree was developed based on entities belonging to a second cluster.

10. The non-transitory computer-readable medium of claim 9, wherein grouping the respective subset of attribute values into the respective cluster comprises:

identifying a first time series of attribute values for a first attribute and a second time series of attribute values for a second attribute;

performing a principal component analysis on the first time series and the second time series;

outputting a principal component data series from the principal component analysis; and grouping the principal component data series into the clusters.

11. The non-transitory computer-readable medium of claim 9, wherein the function of the respective time series uses changes in the respective time series over the time period to compute the trend attribute values, wherein the at least one trend attribute comprises at least one of:

a statistical attribute, a duration attribute computed based on peaks and valleys in the respective time series, or a depression/recovery attribute computed based on rates of change between the peaks and the valleys in the respective time series, a skewness of a probability distribution of the respective time series, or a kurtosis of a probability distribution of the respective time series.

12. The server system of claim 1, wherein the training data comprises credit data and wherein the automated modeling algorithm is trained to predict a credit risk or a credit usage.

* * * * *